United States Patent Office 3,531,277
Patented Sept. 29, 1970

3,531,277
HERBICIDAL COMPOSITION AND METHOD
Alan J. Lemin, Richland Township, Kalamazoo County, Mich., assignor to The Upjohn Company, Kalamazoo, Mich., a corporation of Delaware
No Drawing. Continuation-in-part of application Ser. No. 85,189, Jan. 27, 1961. This application Feb. 4, 1965, Ser. No. 430,483
Int. Cl. A01n 9/20
U.S. Cl. 71—118                                    4 Claims

ABSTRACT OF THE DISCLOSURE

This application pertains to compositions and methods for preventing germination of undesired plant seeds and controlling noxious weeds with N-alkylchlorobenzamides.

---

This application is a continuation-in-part of application Ser. No. 85,189, filed Jan. 27, 1961, now abandoned.

This invention pertains to novel compositions and to a novel process. More particularly, the invention relates to herbicidal compositions comprising N-alkylchlorobenzamides and to a process for preventing germination of undesired plant seeds and controlling the pre-emergence growth of such plants.

The economic damage caused by weeds in field crops is well known. Weeds damage field crops and reduce productivity by competing with the crop plants for mineral nutrients, nitrogen, water, and sunlight. In addition to economic damage to field crops, weeds such as dandelions and crabgrass frustrate the establishment and maintenance of uniform turfs on home lawns, golf courses, and similar areas. Among the methods for combatting weeds that have been tried, selective chemical inhibition appears to hold promise of being efficacious and economical, and a great many chemical herbicides have been contrived.

An object of this invention is to provide compositions for preventing the germination of undesired plant seeds. A further object of the invention is to provide a means for preventing the germination of undesired plant seeds and for controlling the growth of noxious weeds in field crops and turf. A still further object of the invention is to provide a means for controlling noxious weeds such as Johnson grass, crabgrass, pigweed, quackgrass, wild oats, foxtail grasses, mustard (yellow rocket), purslane, lambsquarter, sheep sorrel, and the like in crops such as cereal grains, cotton, peanuts, beans, and strawberries, and in turf.

It has now been found in accordance with invention that N - alkylchlorobenzamides represented by the formula:

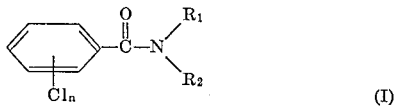

(I)

wherein $R_1$ is alkyl of from 2 to 3 carbon atoms, i.e., ethyl, propyl, and isopropyl; $R_2$ is selected from the group consisting of hydrogen and alkyl (as defined above); and $n$ is an integer from 1 to 3, inclusive, are effective pre-emergence herbicides useful in preventing germination of seeds and controlling the pre-emergence growth of plants by interfusing a soil with a herbicidally effective amount thereof, thus contacting plant seeds and embryonic plants in order to bring about the desired herbicidal effects.

N-alkylchlorobenzamides having Formula I above, some of which are known compounds, can be readily prepared by methods known in the art for preparing benzamides, for example, by reacting a chlorobenzoic acid represented by the formula:

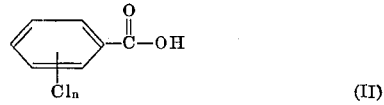

(II)

wherein $n$ is as defined above, with thionyl chloride to obtain the corresponding chlorobenzoyl chloride, and then obtaining the amide by reacting the chlorobenzoyl chloride with a primary or secondary amine represented by the formula:

(III)

wherein $R_1$ and $R_2$ are as defined above.

The chlorobenzoic acids having Formula II above, i.e., 2-chloro-, 3-chloro-, 4-chloro-, 2,3-dichloro-, 2,4-dichloro-, 2,5-dichloro-, 2,6-dichloro-, 3,4-dichloro-, 3,5-dichloro-, 2,3,4-trichloro-, 2,3,5-trichloro-, 2,3,6-trichloro-, 2,4,5-trichloro-, 2,4,6-trichloro-, and 3,4,5-trichlorobenzoic acids are known compounds and methods for their preparation are recorded in the literature; for example, see Huntress, "Organic Chlorine Compounds," John Wiley and Sons, Inc., New York, 1948.

The primary and secondary amines having Formula III above, i.e., ethylamine, propylamine, isopropylamine, diethylamine, dipropylamine, diisopropylamine, N-ethylpropylamine, N-ethylisopropylamine, and N-isopropylpropylamine are known compounds and methods for their preparation abound in the literature, particularly in the case of the primary amines and also the secondary amines in which the alkyls are identical. The secondary amines in which the alkyls are different are conveniently prepared by methods such as those disclosed by Campbell et al., J. Am. Chem. Soc. 66, 82–4, 1944, and British Pats. 600,841 and 602,332.

Illustrative N-alkylchlorobenzamides prepared as disclosed above include N-isopropyl - 2 - chlorobenzamide, N,N - diisopropyl - 2 -chlorobenzamide, N,N-diethyl-2-chlorobenzamide (B.P. 144° C./0.5 mm.), N - ethyl-3-chlorobenzamide, N-propyl - 3 - chlorobenzamide (M.P. 67–68° C.), N-isopropyl-3-chlorobenzamide (M.P. 92–93°C.), N - isopropyl - N-propyl-3-chlorobenzamide, N, N-diethyl - 3-chlorobenzamide (B,P. 109° C./0.4 mm.), N,N - dipropyl-3 - chlorobenzamide (B.P. 122° C./0.4 mm.), N - propyl - 4 - chlorobenzamide (M.P. 91–92° C.), N - isopropyl-4-chlorobenzamide (M.P. 138–139° C.), N,N - diethyl-4-chlorobenzamide (B.P. 112° C./ 0.4 mm.), N,N - diisopropyl - 4-chlorobenzamide (M.P. 81–83° C.), N,N - dipropyl - 4-chlorobenzamide (B.P. 131° C./0.35 mm.), N-ethyl-2,3-dichlorobenzamide, N, N-diisopropyl-2,3 - dichlorobenzamide, N - ethyl-N-propyl - 2,3-dichlorobenzamide, N - isopropyl - 2,4-dichlorobenzamide, N,N - diethyl-2,4-dichlorobenzamide (B.P. 118.5° C./0.35 mm.), N-propyl-2,5-dichlorobenzamide, N - ethyl - N - isopropyl-2,5-dichlorobenzamide, N-ethyl-2,6 - dichlorobenzamide, N,N - diethyl-2,6-dichlorobenzamide, N - propyl-3,4-dichlorobenzamide (M.P. 76–77° C.), N,N- diethyl-3,4-dichlorobenzamide (B.P. 125° C./ 0.3 mm.), N,N - diisopropyl - 3,4 - dichlorobenzamide, (M.P. 79–81° C.), N - ethyl - N-isopropyl-3,4-dichlorobenzamide, N,N - dipropyl-3,4-dichlorobenzamide (B.P. 143° C./0.4 mm.), N - ethyl-3,5-dichlorobenzamide, N-isopropyl - 3,5 - dichlorobenzamide, N-isopropyl-N-propyl-3,5-dichlorobenzabide, N - propyl - 2,3,4-trichlorobenzamide, N,N - diisopropyl-2,3,4 - trichlorobenzamide, N - ethyl - 2,3,5 - trichlorobenzamide, N - isopropyl-2,3, 5 - trichlorobenzamide (M.P. 147–148° C.), N,N - diethyl - 2,3,5 - trichlorobenzamide (B.P. 148° C./0.17 mm.), N,N - dipropyl - 2 ,3,5-trichlorobenzamide, (B.P. 150° C./0.35 mm.), N,N - diisopropyl-2,3,5-trichlorobenzamide (M.P. 80° C.), N - ethyl - 2,3,6-trichlorobenzamide, N - propyl - 2,3,6 - trichlorobenzamide, N-ethyl - N - propyl-2,3,6-trichlorobenzamide, N,N-diisopropyl - 2,3,6 -trichlorobenzamide, N - isopropyl-2,4,5-trichlorobenzamide, N - ethyl - N - isopropyl-2,4,5-trichlorobenzamide, N - propyl - 2,4,6-trichlorobenzamide, N,N - diethyl - 2,4,6-trichlorobenzamide, N - isopropyl-3,4,5 - trichlorobenzamide, N,N - dipropyl-3,4,5-trichlorobenzamide, and N - isopropyl - N-propyl-3,4,5-trichlorobenzamide.

Any N - alkylchlorobenzamide as set forth above can be effectively employed as active ingredient in the herbicidal compositions and process of this invention, the 3-chloro-, 3,4-dichloro-, 2,3,5-trichloro-, and 2,3,6-trichlorobenzamides of Formula I being preferred. It is also preferred that the N-alkylchlorobenzamides of this invention be N,N-dialkyl-substituted on the amido nitrogen. It has been found that the N,N - dialkyl-3-chlorobenzamides are particularly efficacious. Thus, for example, N,N - diethyl-3-chlorobenzamide; N,N - diethyl-3,4-dichlorobenzamide; N,N - diethyl - 2,3,5-trichlorobenzamide; N,N-dipropyl-3-chlorobenzamide; N,N dipropyl-3,4 - dichlorobenzamide; N,N - dipropyl-2,3,5-trichlorobenzamide; N,N - diisopropyl - 3,4-dichlorobenzamide; and N,N - diisopropyl - 2,3,5-trichlorobenzamide have been found to comprise a superior class of N-alkylchlorobenzamide herbicides according to this invention.

Some of the N-alkylchlorobenzamides are solids at ordinary temperatures and some are liquids, as will be apparent from inspection of the physical properties given above. It should be understood, therefore, that the proportion of a liquid active ingredient in the granular, dust, and dispersible powder formulations of this invention be consistent with obtaining a dry, free-flowing composition.

The herbicidal compositions according to the invention include solutions, emulsions, suspensions, dispersible powders, emulsifiable concentrates, granular formulations, and dusts. All of these compositions comprise an N-alkylchlorobenzamide in accordance with Formula I in dispersed or readily dispersible form and a carrier, with or without adjuvants. In general, selective inhibition of undesired weed species in the presence of field crops or in turf is obtained by employing a phytonomic carrier, that is to say, a carrier which can be applied to plants without phytotoxicity or other adverse effects. On the other hand, when general herbicidal activity is desired a phytotoxic carrier, for example, high-boiling mineral oil fractions or chlorohydrocarbons can be used.

The efficacy of N - alkylchlorobenzamides as pre-emergence herbicides is of high order, and the compounds can be applied at relatively low rates per acre for preventing the germination of seeds and controlling the growth of plants. For example, N,N-diethyl-3-chloro-, 3,4-dichloro-, and 2,3,5-trichlorobenzamides; N,N - dipropyl - 3 - chloro-, 3,4-dichloro-, and 2,3,5-trichlorobenzamides; N - isopropyl-3-chlorobenzamide; and N,N-diisopropyl - 3,4 - dichloro- and 2,3,5 - trichlorobenzamides gave complete or substantially complete inhibition of crabgrass, foxtail grass, and Johnson grass, when applied at the rate of 5 to 20 lbs. per acre to newly seeded plots. Little or no phytotoxic effect is apparent among field crop plants such as corn, wheat, rye, soybeans, and peanuts at these and even somewhat higher rates of application. At high rates of application, e.g., 30 or more lbs. per acre the compounds are phytotoxic to corn, wheat, and rye; but legumes, such as peanuts, are not killed. Illustratively, excellent control of crabgrass in lawns has been obtained using concentrations of N,N-dipropyl - 2,3,5 - trichlorobenzamide ranging from 700 p.p.m. (parts per million.)to 12,000 p.p.m. applied at the rate of 2.5 to 10 lbs. per acre. In general, a desired rate of application can be achieved by distributing, over the area to be treated, an aqueous composition in accordance with the invention, containing from about 700 p.p.m. to about 30,000 p.p.m. of active ingredient. It will be understood, of course, that a choice of concentration of active ingredient depends upon the method of application as well as the type of composition and the degree of herbicidal control desired. In general, concentration is not critical within the range indicated since an effective quantity of active ingredient can be applied to a given area by applying greater quantities of a low concentration than of a higher concentration. The concentration of active ingredient in the dispersible powder and emulsifiable concentrates from which the aqueous compositions are prepared can be as high as 99.5% by weight. The concentration of active ingredient in the dust and granular formulations of the invention can vary from about 0.25% to about 80% or more, but advantageously is of the order of 0.50% to 20% by weight. The choice of active-ingredient concentration in solid formulations will in some instances be influenced by the physical properties of the active ingredient, as has been noted above and will be well understood by persons skilled in the formulation art.

The granular formulations of this invention are preferred, because they are convenient to prepare and package, and they are especially suited for distribution via home lawn fertilizer spreaders as well as conventional agricultural equipment. They are prepared with about 0.25% to about 80%, preferably 0.50% to 20% by weight, of active ingredient and a granular carrier, for example, vermiculite, pyrophyllite, and attapulgite. The active ingredient can be dissolved in a volatile solvent such as ethylene dichloride, methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25% to about 80% by weight, preferably 0.50% to 20% of the active ingredient, with a solid pulverulent carrier which maintains the composition in a dry, free-flowing state. In the case of the N-alkylchlorobenzamides that are solids at ordinary temperatures, the herbicidal dusts of the invention can be prepared by admixing with a solid diluent and then milling. Preferably, however, the active ingredient is dissolved in a volatile organic solvent, of the kinds indicated above, and they sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid, compounded fertilizers. Such solid compositions can be applied to soil in the form of dusts by the use of conventional machinery.

Dispersible powders are prepared by incorporating a surfactant in a dust composition prepared as described above. Such a dispersible powder can be dispersed in water to any desired concentration and applied to soil by conventional spray equipment. Conveniently, the dispersible powders are formulated with concentrations of active ingredient up to about 80%, preferably about 10% to 60% by weight. Surfactants useful in preparing such dispersible powder compositions include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and poly-alcohol carboxylic acid esters (Emcol H–77), blends of polyoxyethylene ethers and oil-soluble sulfonates (Emcol H–400), blends of alkylarylsulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups, and blends of calcium alkylarylsulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified):

|  | Percent |
| --- | --- |
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil or turf at the rate of 40 gals. per acre to give a total application of active ingredient of 1 lb. per acre.

The compounds of this invention can be applied to soil and turf in aqueous sprays without a solid carrier. However, since the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess N-alkylchlorobenzamide will be thrown out of solution. (The compounds dissolve in water to about 50 p.p.m.) In an emulsion, the solvent phase is dispersed in the water phase and the active ingredient is held in solution in the dispersed phase. In this way, uniform distribution of active ingredient in an aqueous spray is achieved. A solvent carrier in which N-alkylchlorobenzamides are highly soluble is desirable so that relatively high concentrations of active ingredient can be obtained. Sometimes, one or more solvent carriers with or without cosolvents can be used in order to obtain concentrated solutions of the active ingredient, the main consideration being to employ a water-immiscible solvent for the N-alkylchlorobenzamide that will hold the compound in solution over the range of concentrations useful for preventing germination of undesired seeds and controlling growth of plants.

The emulsifiable concentrates of the invention are prepared by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed if desired.

Advantageously, the concentration of active ingredient in the emulsifiable concentrates can range from about 5% to about 50% by weight, preferably from about 10% to 40%. A concentrate comprising 20% (by weight) of active ingredient dissolved in a water-immiscible solvent of the kind noted above can be admixed with an aqueous medium in the proportions of about 13 ml. of concentrate with 1 gal. of medium to give a mixture containing about 700 parts of active ingredient per million parts of liquid carrier. Similarly, 1 qt. of a 20% concentrate mixed with 40 gals. of water provides about 1200 p.p.m. of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium lignosulfonate, and the like.

The rates of application to soils, or turf to be protected from noxious weeds will depend upon the species of plants to be controlled, the presence or absence of desirable species, the season of year at which treatment is undertaken, and the method and efficiency of application. In general, selective herbicidal activity is obtained when the active ingredients are applied at the rate of about 0.125 to about 50 lbs. per acre, preferably at the rate of 0.25 to 25 lbs. per acre.

The compositions containing N-alkylchlorobenzamides, according to the invention, can be interfused with soil by conventional methods. For example, an area of soil can be treated prior to or after seeding by spreading a granular formulation in accordance with the invention on the plant growth medium with or without mixing. For home application, a conventional hand propelled spreader is satisfactory. Dispersible powder suspensions, emulsions, or solutions can be sprayed from boom-type power sprayers or from hand-operated knapsack sprayers. Dusts can be applied by powder dusters, or by hand-operated dusters. Dusts and granular formulations can also be applied at the time of seeding in bands spanning the seeded rows.

The term "soil" is employed in the present specification and claims in its broadest sense. Hence the term "soil" refers to a substance in which plants can take root and grow, and includes not only earth but compost, manure, muck, humus, sand, and the like.

The following examples are illustrative of the process and products of the present invention, but are not to be construed as limiting.

EXAMPLE 1

A granular formulation having the following percentage composition:

|  | Percent |
| --- | --- |
| N,N-dipropyl-2,3,5-trichlorobenzamide | 3.7 |
| Vermiculite (30/60 mesh) | 96.3 | was prepared by spraying a solution of 220 g. of N,N-dipropyl-2,3,5-trichlorobenzamide in 1000 ml. of methylene chloride on 5780 g. of vermiculite (30 to 60 mesh) while the vermiculite was being tumbled and stirred so as to assure even distribution. The methylene chloride was then evaporated, leaving the N,N-dipropyl-2,3,5-trichlorobenzamide adsorbed on the vermiculite.

The herbicidal efficacy of the formulation was then determined by spreading the treated vermiculite on test plots of soil planted to rows of crabgrass, green foxtail, Johnson grass, quackgrass, wheat, rye, peanuts, and corn. After 21 days the inhibition of seed germination and plant growth was noted, when compared with control plots of the same cultural treatment. The results are shown in Table 1.

|  | Percent |
|---|---|
| N,N-dipropyl-2,3,5-trichlorobenzamide | 40.0 |
| Technical alkyl naphthalene boiling at 238° to 293° C. (Velsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X–151) | 5.0 | was prepared by mixing 40.0 lbs. of N,N-dipropyl-2,3,5-trichlorobenzamide, 13.7 lbs. of Velsicol AR50, 12.3 lbs. of xylene, 11.3 lbs. of isopropanol, 17.7 lbs. of ethylene dichloride, and 5.0 lbs. of Triton X–151.

TABLE I

| Rates of application, active ingredient in lbs./acre | Percent Inhibition | | | | | | | |
|---|---|---|---|---|---|---|---|---|
|  | Corn | Wheat | Rye | Peanuts | Crabgrass | Green foxtail | Quackgrass | Johnson grass |
| 20 | 0 | 0 | 0 | 0 | 100 | 100 | 100 | 100 |
| 10 | 0 | 0 | 0 | 0 | 100 | 100 | 100 | 100 |
| 5 | 0 | 0 | 0 | 0 | 100 | 50 | 60 | 100 |

In the same manner granular compositions containing N,N-diethyl-3-chloro-, 3,4-dichloro-, and 2,3,5-trichlorobenzamide; N,N-dipropyl-3-chloro- and 3,4-dichlorobenzamide; N-isopropyl-3-chlorobenzamide; and N,N-diisopropyl-3,4-dichloro- and 2,3,5-trichlorobenzamide were prepared and tested, with similar results.

EXAMPLE 2

A dispersible powder concentrate having the following percentage composition:

|  | Percent |
|---|---|
| N-isopropyl-3-chlorobenzamide | 45.8 |
| Polymerized sodium salt of substituted benzoid long-chain sulfonic acid (Daxad 27) | 9.2 |
| Kaolinite | 45.0 | was prepared by mixing 250 g. of N-isopropyl-3-chlorobenzamide, 50 g. of a polymerized sodium salt of substituted benzoid long-chain sulfonic acid (Daxad 27), and 245 g. of kaolinite. The mixture was milled to a particle size averaging 5 to 30 microns. It was suspended in 10 gals. of water, giving an aqueous spray containing about 6000 p.p.m. of active ingredient.

EXAMPLE 3

An emulsifiable concentrate having the following percentage composition:

|  | Percent |
|---|---|
| N,N-diisopropyl-2,3,5-trichlorobenzamide | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X–151) | 5.1 | was prepared by mixing 15.0 lbs. of N,N-diisopropyl-2,3,5-trichlorobenzamide, 19.7 lbs. of Velsicol AR50, 17.4 lbs. of xylene, 17.4 lbs. of isopropanol, 25.4 lbs. of ethylene dichloride, and 5.1 lbs. of Triton X–151.

6.67 lbs. of the concentrate mixed with 10 gals. of water gave a spray emulsion containing 12,000 p.p.m. of N,N-diisopropyl-2,3,5-trichlorobenzamide.

EXAMPLE 4

An emulsifiable concentrate having the following percentage composition:

1.67 lbs. of the concentrate mixed with 10 gals. of water gave a spray emulsion containing 8,000 p.p.m. of N,N-dipropyl-2,3,5-trichlorobenzamide.

EXAMPLE 5

A dispersible powder concentrate having the following percentage composition:

|  | Percent |
|---|---|
| N-isopropyl-3-chlorobenzamide | 50 |
| Kaolinite clay (finely divided) | 46 |
| Sodium salt of condensed mononaphthalene sulfonic acid (Lomar D) | 4 | was prepared by mixing 50 g. of N-isopropyl-3-chlorobenzamide, 46 g. of the kaolinite clay, and 4 g. of Lomar D. The mixture was milled to an average particle size of 5 to 30 microns.

EXAMPLE 6

A granular formulation having the following percentage composition:

|  | Percent |
|---|---|
| N,N-dipropyl-2,3,5-trichlorobenzamide | 1 |
| Pyrophyllite (30/60 mesh) | 99 | was prepared by dissolving 1.0 lb. of N,N-dipropyl-2,3,5-trichlorobenzamide in 10.0 l. of ethylene dichloride and spraying the solution on 99.0 lbs. of pyrophyllite. The granules were dried and then packaged for use.

EXAMPLE 7

A dust formulation having the following percentage composition:

|  | Percent |
|---|---|
| N,N-diethyl-2,3,5-trichlorobenzamide | 5.0 |
| Vermiculite (30/60 mesh) | 95.0 | was prepared by spraying a solution of 300 g. of N,N-diethyl-2,3,5-trichlorobenzamide in 1000 ml. of methylene chloride on 5700 g. of vermiculite (30 to 60 mesh) while the vermiculite was being tumbled and stirred so as to assure even distribution. The methylene chloride was then evaporated, leaving the N,N-diethyl-2,3,5-trichlorobenzamide adsorbed on the vermiculite. The treated vermiculite was then pulverized to a particle size averaging 5 to 30 microns.

I claim:
1. The method of preventing germination of plant seeds and controlling pre-emergence growth of plants which comprises interfusing soil with a herbicidally effective amount of N,N-diethyl-3-chlorobenzamide.

2. The method of preventing germination of plant seeds and controlling pre-emergence growth of plants which comprises interfusing soil with a herbicidally effective amount of N,N-diethyl-3,4-dichlorobenzamide.

3. The method of preventing germination of plant seeds and controlling pre-emergence growth of plants which comprises interfusing soil with a herbicidally effective amount of N-isopropyl-3-chlorobenzamide.

4. Emulsifiable concentrate comprising the herbicide N-isopropyl-3-chlorobenzamide, a substantially water-immiscible solvent carrier therefor, and a surfactant, said N-isopropyl-3-chlorobenzamide constituting about 5% by weight to about 50% of the composition.

References Cited

UNITED STATES PATENTS

| | | | |
|---|---|---|---|
| 2,412,510 | 12/1946 | Jones | 71—2.6 |
| 2,551,891 | 5/1951 | Martin. | |
| 2,848,470 | 8/1958 | Girard et al. | 71—2.6 X |
| 2,936,323 | 5/1960 | Eden | 71—2.3 |
| 3,014,063 | 12/1961 | McLane et al. | 71—2.6 |
| 3,014,965 | 12/1961 | Newcomer et al. | 71—2.6 X |
| 3,077,498 | 2/1963 | Baker et al. | 71—2.6 |

FOREIGN PATENTS 785,989  11/1957  Great Britain.

OTHER REFERENCES

King: Insects and Repellants, U.S. Dept. of Agric., Handbook No. 69, May 1954, pages 4 to 10 and 58 to 63 (pages 59 and 60 particularly relied upon).

Pizey et al.: J. Science Food Agric., vol. 10, No. 11, November 1959, pages 577 to 584 (pages 578 to 581 particularly relied upon).

JAMES O. THOMAS, JR., Primary Examiner

U.S. Cl. X.R.

260—558